(12) United States Patent
Wang et al.

(10) Patent No.: US 11,620,191 B2
(45) Date of Patent: *Apr. 4, 2023

(54) FILESET PASSTHROUGH USING DATA MANAGEMENT AND STORAGE NODE

(71) Applicant: Rubrik, Inc., Palo Alto, CA (US)

(72) Inventors: Zhicong Wang, San Francisco, CA (US); Looi Chow Lee, Mountain View, CA (US); Andrew Kwangyum Park, Jr., Mountain View, CA (US); Karthikeyan Srinivasan, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/148,991

(22) Filed: Oct. 1, 2018

(65) Prior Publication Data

US 2020/0104216 A1    Apr. 2, 2020

(51) Int. Cl.
*G06F 11/14* (2006.01)
*G06F 16/11* (2019.01)

(52) U.S. Cl.
CPC ........ *G06F 11/1464* (2013.01); *G06F 16/128* (2019.01); *G06F 2201/84* (2013.01)

(58) Field of Classification Search
CPC . G06F 11/1464; G06F 16/128; G06F 2201/84
See application file for complete search history.

(56) References Cited

U.S. PATENT DOCUMENTS

| 8,074,035 | B1 * | 12/2011 | Per | G06F 11/1458 |
| | | | | 707/610 |
| 10,656,865 | B1 * | 5/2020 | Janse Van Rensburg | ................... |
| | | | | G06F 3/067 |
| 10,659,523 | B1 * | 5/2020 | Joseph | H04L 67/10 |
| 10,853,182 | B1 * | 12/2020 | Vig | G06F 16/23 |

(Continued)

FOREIGN PATENT DOCUMENTS

KR    20110125788 A  *  11/2011

OTHER PUBLICATIONS

"U.S. Appl. No. 15/897,084, Non Final Office Action dated Jul. 1, 2020", 34 pages.

(Continued)

*Primary Examiner* — Ashish Thomas
*Assistant Examiner* — Abdullah A Daud
(74) *Attorney, Agent, or Firm* — Holland & Hart LLP

(57) ABSTRACT

A data management and storage (DMS) cluster of peer DMS nodes manages data of a compute infrastructure by generating snapshots of partitions of a fileset of the compute infrastructure and providing a passthrough for storing the snapshots in a data storage separate from the DMS cluster, such as a cloud computing system. In one approach, the DMS nodes determine partitions of a fileset using fileset metadata, generates snapshots of the partitions, and stores the snapshots in the data storage. Each DMS node may include a local storage which is used to facilitate creation of a snapshot of a partition. The snapshot may be removed from the local storage after being sent to the data storage. Rather (Continued)

than storing the snapshot, the DMS cluster stores fileset metadata that is referenced to retrieve the snapshot from the data storage. The snapshot is deployed to retrieve a file stored in the partition.

19 Claims, 16 Drawing Sheets

(56) References Cited

U.S. PATENT DOCUMENTS

| | | | | |
|---|---|---|---|---|
| 10,990,581 | B1* | 4/2021 | Jain | G06F 16/2358 |
| 2005/0187992 | A1* | 8/2005 | Prahlad | G06F 16/128 |
| 2005/0203973 | A1* | 9/2005 | Yagawa | G06F 11/2094 |
| 2007/0288490 | A1* | 12/2007 | Longshaw | G06F 11/1464 |
| 2011/0078118 | A1* | 3/2011 | Kushwah | G06F 11/1451 |
| | | | | 707/646 |
| 2011/0219208 | A1* | 9/2011 | Asaad | G06F 9/06 |
| | | | | 712/12 |
| 2012/0089775 | A1* | 4/2012 | Ranade | G06F 16/183 |
| | | | | 711/170 |
| 2013/0283097 | A1* | 10/2013 | Chen | G06F 9/5066 |
| | | | | 718/103 |
| 2014/0006465 | A1* | 1/2014 | Davis | G06F 16/183 |
| | | | | 707/827 |
| 2014/0280520 | A1* | 9/2014 | Baier | H04L 67/02 |
| | | | | 709/203 |
| 2015/0074168 | A1* | 3/2015 | Hartman | G06F 16/182 |
| | | | | 709/201 |
| 2015/0212897 | A1* | 7/2015 | Kottomtharayil | G06F 16/128 |
| | | | | 714/20 |
| 2015/0234846 | A1* | 8/2015 | Moore | G06F 16/137 |
| | | | | 707/747 |
| 2015/0244795 | A1* | 8/2015 | Cantwell | H04L 67/1095 |
| | | | | 709/202 |
| 2015/0309765 | A1* | 10/2015 | Nagahara | H04M 3/567 |
| | | | | 345/2.2 |
| 2016/0048342 | A1* | 2/2016 | Jia | G06F 3/0611 |
| | | | | 711/114 |
| 2017/0003899 | A1* | 1/2017 | Raja | G06F 3/065 |
| 2017/0090688 | A1* | 3/2017 | Anderson | G06F 3/0482 |
| 2017/0099200 | A1* | 4/2017 | Ellenbogen | G06N 5/022 |
| 2017/0109243 | A1* | 4/2017 | Kumar | G06F 8/355 |
| 2018/0081766 | A1* | 3/2018 | Ghuge | G06F 11/1662 |
| 2018/0300242 | A1* | 10/2018 | Liu | G06F 16/00 |
| 2018/0314749 | A1* | 11/2018 | Raja | G06F 11/1458 |
| 2019/0026187 | A1* | 1/2019 | Gulam | G06F 16/128 |
| 2019/0205449 | A1* | 7/2019 | Erickson | G06F 16/24568 |
| 2019/0243547 | A1* | 8/2019 | Duggal | G06F 3/0619 |
| 2019/0250991 | A1 | 8/2019 | Lee et al. | |
| 2019/0354390 | A1* | 11/2019 | Gill | G06F 3/0482 |
| 2019/0391880 | A1* | 12/2019 | Wang | G06F 11/1451 |
| 2020/0034248 | A1* | 1/2020 | Nara | G06F 11/1461 |
| 2020/0104216 | A1* | 4/2020 | Wang | G06F 16/128 |

OTHER PUBLICATIONS

"U.S. Appl. No. 15/897,084, Response filed Nov. 2, 2020 to Non Final Office Action dated Jul. 1, 2020", 11 pages.

"U.S. Appl. No. 15/897,084, Final Office Action dated Feb. 16, 2021", 36 pages.

"U.S. Appl. No. 15/897,084, Response filed Apr. 15, 2021 to Final Office Action dated Feb. 16, 2021", 10 pages.

"U.S. Appl. No. 15/897,084, Advisory Action dated May 7, 2021", 4 pages.

"U.S. Appl. No. 15/897,084, Response filed May 11, 2021 to Advisory Action dated May 7, 2021", 12 pages.

U.S. Appl. No. 15/897,084, filed Feb. 14, 2018, Fileset Partitioning for Data Storage and Management.

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| | ... | |

FIG. 3A

Job Queue 224

| job_id | start_time | job_type | job_info |
|---|---|---|---|
| 00001 | 0600 | pull snapshot | target = m001 |
| 00002 | 0610 | replicate | target = m003 |
| 00003 | 0615 | run analytics | target = m002 |
| 00004 | 0615 | trash collection | xxx |
| . . . | | | |

FIG. 3B

Job Queue 224

| job_id | start_time | job_type | job_info |
|---|---|---|---|
| 00002 | 0610 | replicate | target = m003 |
| 00003 | 0615 | run analytics | target = m002 |
| 00004 | 0615 | trash collection | xxx |
| . . . | | | |
| 00011 | 0605 | fetch data | target = m001/p001 |
| 00012 | 0605 | fetch data | target = m001/p002 |
| 00013 | 0605 | fetch data | target = m001/p003 |
| . . . | | | |

FIG. 3C

Partition Table 225

| p_id | parent_id | p_definition |
|---|---|---|
| m001/p001 | m001 | /a-/c |
| m001/p002 | m001 | /d-/ej |
| m001/p003 | m001 | /ek-/h |
| ... | | |
| random_name1 | m001/p001 | /aa-/af |
| random_name2 | m001/p001 | /ag-/at |
| ... | | |

FIG. 3E

Partition Table 225

| p_id | parent_id | p_definition |
|---|---|---|
| m001/p001 | m001 | /a-/c |
| m001/p002 | m001 | /d-/ej |
| m001/p003 | m001 | /ek-/h |
| ... | | |

FIG. 3D

Snapshot Table 226

| ss_id | ss_time | im_list |
|---|---|---|
| m001/p001.ss1 | 20171001.0300 | m001/p001.im1 |
| m001/p001.ss2 | 20171001.0900 | m001/p001.im1, m001/p001.im1-2 |
| m001/p001.ss3 | 20171001.1500 | m001/p001.im1, m001/p001.im1-2, m001/p001.im2-3 |
| m001/p001.ss4 | 20171001.2100 | m001/p001.im1, m001/p001.im1-2, m001/p001.im2-3, m001/p001.im3-4 |
| m001/p001.ss5 | 20171002.0300 | . . . |
| . . . | | |

FIG. 3F

Image Table 228

| im_id | im_location |
|---|---|
| m001/p001.im1 | . . . |
| m001/p001.im1-2 | |
| m001/p001.im2-3 | |
| m001/p001.im3-4 | |
| . . . | |

FIG. 3G

Snapshot Table 226

| ss_id | ss_time | im_list |
|---|---|---|
| m001/p001.ss1 | 20171001.0300 | m001/p001.im1 |
| m001/p001.ss2 | 20171001.0900 | m001/p001.im1, m001/p001.im1-2 |
| m001/p001.ss3 | 20171001.1500 | m001/p001.im1, m001/p001.im1-2, m001/p001.im2-3 |
| m001/p001.ss4 | 20171001.2100 | m001/p001.im1, m001/p001.im1-2, m001/p001.im2-3, m001/p001.im3-4 |
| m001/p001.ss5 | 20171002.0300 | m001/p001.im1, . . ., m001/p001.im4-5 |
| . . . | | |
| m001/p001.ss12 | 20171003.2100 | m001/p001.im1, . . ., m001/p001.im11-12 |

FIG. 4A

Image Table 228

| im_id | im_location |
|---|---|
| m001/p001.im1 | . . . |
| m001/p001.im1-2 | |
| m001/p001.im2-3 | |
| m001/p001.im3-4 | |
| m001/p001.im4-5 | |
| . . . | |
| m001/p001.im11-12 | |

FIG. 4B

Snapshot Table 226

| ss_id | ss_time | im_list |
|---|---|---|
| m001.p001.ss1 | 20171001.0300 | m001.p001.im5-1 |
| m001.p001.ss2 | 20171001.0900 | m001.p001.im1, m001.p001.im1-2 |
| m001.p001.ss3 | 20171001.1500 | m001.p001.im1, m001.p001.im1-2, m001.p001.im2-3 |
| m001.p001.ss4 | 20171001.2100 | m001.p001.im1, m001.p001.im1-2, m001.p001.im2-3, m001.p001.im3-4 |
| m001.p001.ss5 | 20171002.0300 | m001.p001.im5 |
| . . . | | |
| m001.p001.ss12 | 20171003.2100 | m001.p001.im5, . . ., m001.p001.im11-12 |

FIG. 4C

Image Table 228

| im_id | im_location |
|---|---|
| m001.p001.im1 | . . . |
| m001.p001.im1-2 | |
| m001.p001.im2-3 | |
| m001.p001.im3-4 | |
| m001.p001.im4-5 | |
| . . . | |
| m001.p001.im11-12 | |
| m001.p001.im5 | |
| m001.p001.im5-1 | |

FIG. 4D

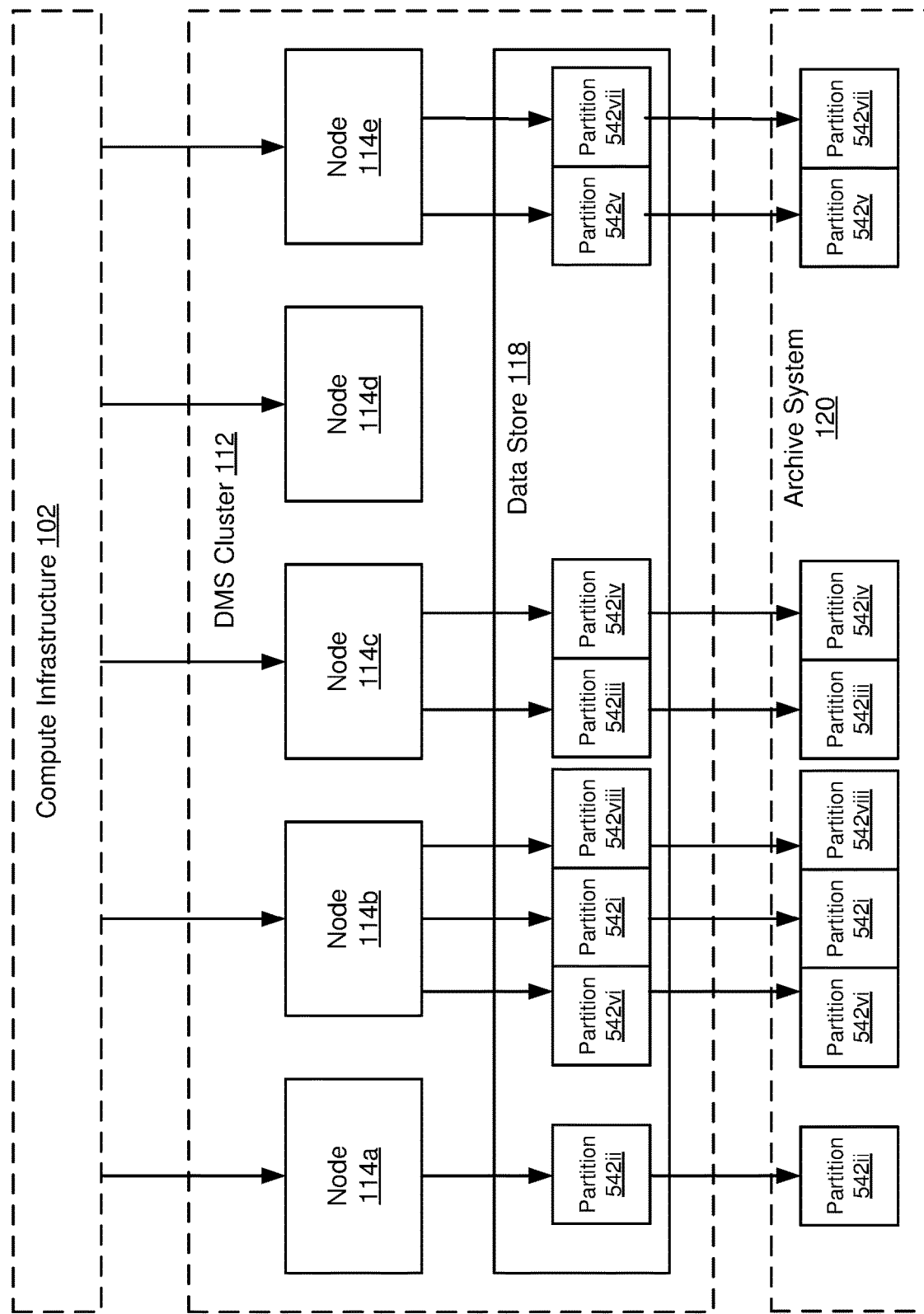

FILESET PASSTHROUGH USING DATA MANAGEMENT AND STORAGE NODE

BACKGROUND

1. Technical Field

The present invention generally relates to managing and storing data, for example, for backup purposes in a multi-tenant compute infrastructure.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms. Furthermore, multi-tenant compute infrastructures that host multiple tenants on shared hardware may restrict (e.g., external) access to the virtual machines of each tenant, and the virtual tenant network that connect the virtual machines.

Thus, there is a need for better approaches to managing and storing data, particularly across different virtual machine platforms, and in multi-tenant computing infrastructures.

SUMMARY

A data management and storage (DMS) cluster acts as a passthrough for storing snapshots of partitions of a fileset of a compute infrastructure in a remote data storage, such as a cloud computing system. The DMS cluster provides DMS services to the compute infrastructure such as creating snapshots and restoring snapshots, while remote storage of the snapshots can reduce local storage requirements in the DMS cluster while performing the DMS services. In some embodiments, pulling snapshots of a fileset includes receiving, by a peer DMS node of the peer DMS nodes, fileset metadata for the fileset. The DMS node determines a plurality of partitions for the fileset based on the fileset metadata. The peer DMS nodes generate the snapshots of the plurality of partitions, and store the snapshots of the plurality of partitions in a data storage separate from a distributed data store of the DMS cluster.

In some embodiments, generating the snapshots of the plurality of partitions includes each of the peer DMS nodes generating a snapshot of a partition using a local storage to store the partition. The distributed data store may be implemented across local storages of the plurality of peer DMS nodes.

Some embodiments include a DMS cluster including a plurality of peer DMS nodes that service a compute infrastructure, and a distributed data store implemented across the peer DMS nodes. Each of the peer DMS nodes includes a software stack for: receiving fileset metadata for a fileset; determining a plurality of partitions for the fileset based on the fileset metadata; generating a snapshot of a partition of the plurality of partitions; and storing the snapshot of the partition in a data storage separate from the distributed data store of the DMS cluster.

Some embodiments include a non-transitory computer-readable medium comprising instructions that when executed by a processor cause the processor to execute a method for pulling snapshots of a fileset of a compute infrastructure serviced by a DMS cluster, the cluster comprising a plurality of peer DMS nodes and a distributed data store implemented across the peer DMS nodes. The method includes: receiving fileset metadata for a fileset; determining a plurality of partitions for the fileset based on the fileset metadata; generating a snapshot of a partition of the plurality of partitions; and storing the snapshot of the partition in a data storage separate from the distributed data store of the DMS cluster Other aspects include components, devices, systems, improvements, methods, processes, applications, computer readable mediums, and other technologies related to any of the above.

BRIEF DESCRIPTION OF THE DRAWINGS

FIGS. 3A-3G are DMS tables that illustrate operation of the system of FIGS. 1-2, according to one embodiment.

FIGS. 4A-4D are DMS tables that illustrate updating of snapshot images, according to one embodiment.

FIGS. 5A-5D are block diagrams that illustrate a DMS cluster that operates as a passthrough for partitioned snapshot data to an archive system, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A data management and storage (DMS) cluster of peer DMS nodes manages data of a compute infrastructure. The DMS cluster generates snapshots of partitions of a fileset of the compute infrastructure, and stores the snapshots in a data storage separate from the DMS cluster. The data storage may be a cloud computing system, or some other end target which may be configurable. In one approach, the DMS nodes determine partitions of a fileset using fileset metadata, generates snapshots of the partitions, and stores the snapshots in the data storage. Each DMS node may include a local storage which in a pull snapshot job is used to facilitate creation of a snapshot for a partition, and acts as a passthrough for archiving to the storage system. The snapshot may be removed from the local storage after the snapshot is stored in the data storage. Multiple peer DMS nodes may operate in parallel to increase the speed of generating snapshots of multiple partitions of the file set.

Rather than storing the snapshot in the local storage, the DMS cluster acts as a passthrough for the snapshot to the data storage. The DMS cluster stores fileset metadata that can be referenced to restore a file of the partition from the snapshot. To restore the partition, the DMS cluster retrieves the snapshot from the data storage. Multiple peer DMS nodes may operate in parallel to increase the speed of restoring multiple partitions of the file set.

The peer processing of the DMS nodes of the DMS cluster increases the overall processing speed for large fileset having a large number of partitions, while remote storage to a cloud computing system or other separate data storage reduces local storage requirements on each DMS node. Furthermore, the temporary space required on each DMS node may be reduced by operating additional DMS nodes in parallel, and using smaller partitions for the fileset. By controlling the number of DMS nodes concurrently dedicated to a job, the DMS cluster provides flexibility for controlling the amount of system resources that can be dedicated the job.

Figure 1:
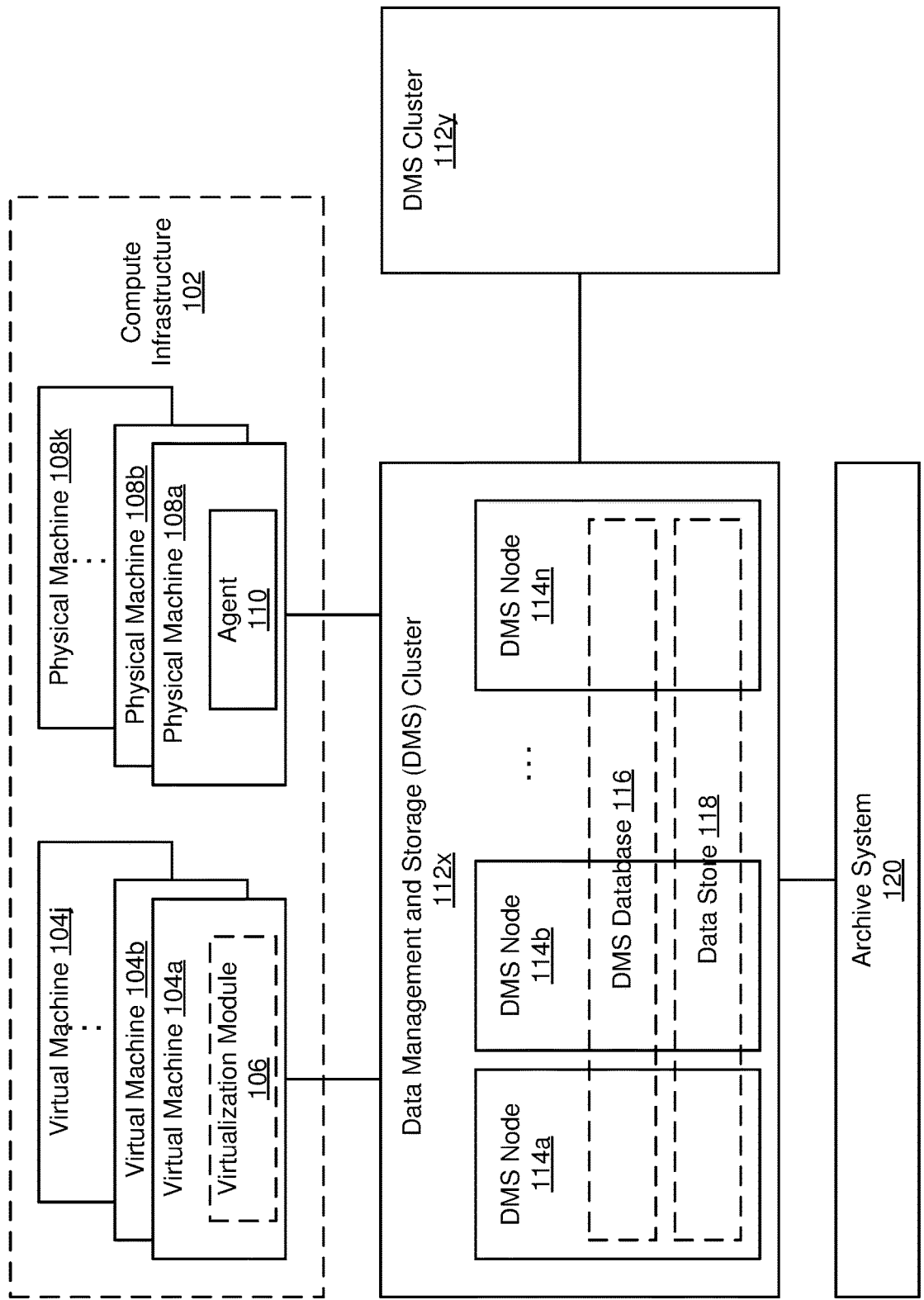
FIG. 1 is a block diagram of a system for managing and storing data, according to one embodiment.

In more detail, FIG. 1 is a block diagram illustrating a system for managing and storing data, according to one embodiment. The system includes a data management and storage (DMS) cluster 112$x$, a secondary DMS cluster 112$y$ and an archive system 120. The DMS system provides data management and storage services to a compute infrastructure 102, which may be used by multiple tenants. Examples of tenants may include an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

The compute infrastructure 102 includes both virtual machines (VMs) 104$a$-$j$ and physical machines (PMs) 108$a$-$k$. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108$a$-$n$ can also use different operating systems running various applications. Microsoft Windows running Microsoft SQL or Oracle databases, and Linux running web servers are some examples. In some embodiments, the virtual machines 104 are software simulations of computing systems that execute on one or more of the physical machines 108. Each physical machine 108 may be a host machine that includes a hypervisor that create and executes one or more virtual machines 104 of tenants 122.

The DMS cluster 112 manages and stores data for the compute infrastructure 102, such as for one or more tenants of the compute infrastructure. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112$x$ enables recovery of backup data. Derivative workloads (e.g., testing, development, and analytic workloads) may also use the DMS cluster 112$x$ as a primary storage platform to read and/or modify past versions of data.

In this example, to provide redundancy, two DMS clusters 112$x$-$y$ are used. From time to time, data stored on DMS cluster 112$x$ is replicated to DMS cluster 112$y$. If DMS cluster 112$x$ fails, the DMS cluster 112$y$ can be used to provide DMS services to the compute infrastructure 102 with minimal interruption.

Archive system 120 archives data for the computer infrastructure 102. The archive system 120 is an example of a data storage that is separate from the DMS cluster 112. The archive system 120 may include a cloud computing system, a network file system (NFS) store, or an object store. For example, a cloud computing system may provide services to the DMS cluster 112 including processing and data storage services via an application programming interface (API) of the cloud computing system. The DMS cluster 112 may access the cloud computing system using the API to store snapshots within a data storage of the cloud computing system. In some embodiments, the archive system 120 includes a network file system (NFS) store or object store. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114$a$-$n$ that operate autonomously to collectively provide the DMS services, including managing and storing data. A DMS node 114 includes a software stack, processor and data storage. DMS nodes 114 can be implemented as physical machines and/or as virtual machines, and in some embodiments, may be implemented in the compute infrastructure 102 or some other compute infrastructure. The DMS nodes 114 are interconnected with each other, for example, via cable, fiber, backplane, and/or network switch. In some embodiments, the end user does not interact separately with each DMS node 114, but interacts with the DMS nodes 114$a$-$n$ collectively as one entity, namely, the DMS cluster 112. For example, the DMS nodes 114 may be peer DMS nodes each having the capability to perform DMS services, either individually or by working with other DMS nodes 114.

The DMS nodes 114 are peers and preferably each DMS node 114 includes common functionality. The DMS cluster 112 automatically configures the DMS nodes 114 as new nodes are added to the DMS cluster 112 or existing nodes are dropped or fail. For example, the DMS cluster 112 automatically discovers new nodes, or otherwise may control the allocation of DMS nodes 114 to the DMS cluster 112. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, such as the definitions of the various partitions for a fileset, as will be described in more detail in FIG. 2. In the following examples, these are shown as tables but other data structures could also be used. The data store 118 contains the actual backup data from the compute infrastructure 102, for example snapshots of the partitions of the filesets being backed up. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided. In some embodiments, the DMS cluster 112 may index fileset metadata and provide a passthrough for storing snapshots to the archive system 120. Snapshots may be temporarily stored in the data store 118 of the DMS cluster 112 prior to transfer to the archive system 120 for more permanent storage.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
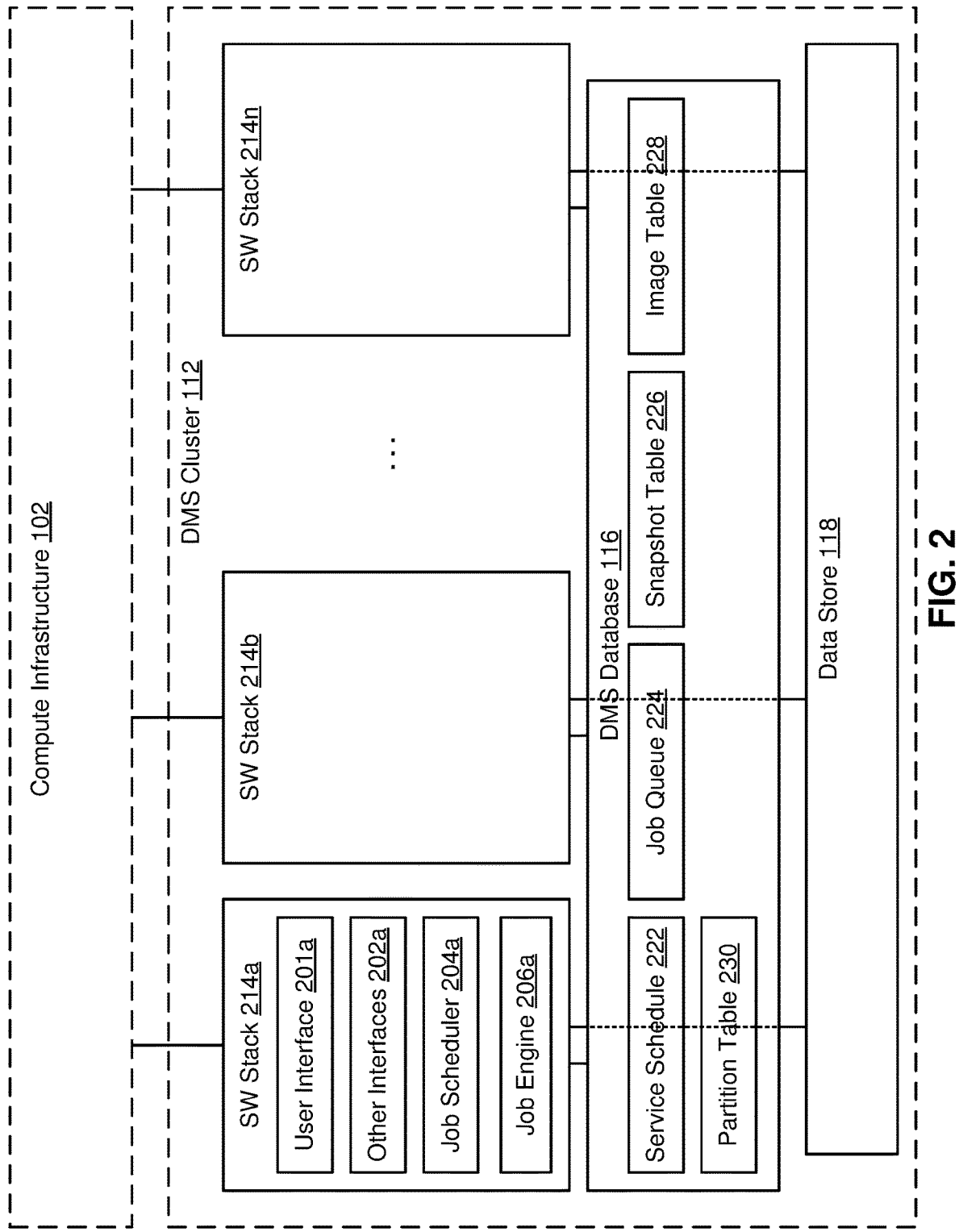
FIG. 2 is a block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226, an image table 228, and a partition table 230. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a, b, c. The image table is an index of images to their location in the data store 118. For example, image a is stored at location aaa of the data store 118, image b is stored at location bbb, etc. More details of example implementations are provided in FIGS. 3 and 4 below.

The partition table 230 is a data structure that stores fileset metadata defining one or more partitions of a fileset, as determined by the DMS cluster 112. Using the method of FIG. 6, filesets to be backed up are divided into one or more partitions prior to the DMS cluster 112 capturing snapshots of the data. The partition table 230 indicates which portion of a fileset is associated with each partition. For example, partition i may contain files/a-/c of a fileset for machine x; partition ii contains files/d-/f, and so on. When the DMS cluster 112 acts as a passthrough, the partition table may further include a reference to a remote data storage location where a snapshot of a partition is stored. More details of example implementations are provided in FIG. 3 below.

DMS database 116 also stores metadata information for the data in the data store 118 or archive system 120. The metadata information may include fileset metadata defining file names, file sizes, file content types, permissions for files, various times such as when the file was created or last modified.

The snapshot table 226 and image table 228 are data structures that index the snapshots captured by the DMS cluster 112. If a fileset is divided into multiple partitions, then the DMS cluster 112 pulls snapshots of each partition and the snapshot table indexes these partition snapshots. In this example, snapshots are decomposed into images, which are stored in the data store 118 (e.g., temporarily), and then in an archive system 120. The snapshot table 226 describes which images make up each snapshot. For example, the snapshot of partition i of machine x taken at time y can be constructed from images a, b, c. The image table is an index of images to their location in the data store. For example, image a is stored at location aaa of the data store 118, image b is stored at location bbb, etc. More details of example implementations are provided in FIG. 3 below.

FIGS. 3-5 illustrate operation of the DMS system shown in FIG. 2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that DMS cluster can find the machine in the compute infrastructure. It is also identified by machine_id, which is a unique ID used internally by the DM cluster. In this example, there is a mix of virtual machines (VMxx) and physical machines (PMxx). The machines are also identified by machine_id, which is a unique ID used internally by the DMS cluster 112.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.
   Replication policy: The backups on the primary DMS cluster for the prior 7 days must also be replicated on the secondary DMS cluster 112y.
   Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

In some embodiments, an SLA may define a job that uses the DMS cluster 112 as a passthrough for storing snapshots to a data storage, such as the archive system 120. Here, the archive policy may indicate that backups that are more than 0 days old may be moved to the archive system 120.

From the service schedule 222, the job schedulers 204 populate the job queue 224. FIGS. 3B-C are examples of a job queue 224. Each row is a separate job. job_id identifies a job and start_time is the scheduled start time for the job. job_type defines the job to be performed and job_info includes additional information for the job. The jobs in queue 224 are accessible by any of the job engines 206, although some may be assigned or preferred to specific DMS nodes. The jobs in queue 224 are accessible by any of the job engines 206, although some may be assigned or preferred to specific DMS nodes.

FIG. 3B shows a job queue 224 at a time prior to the start_time of job 00001 in the queue 224. Job 00001 is a job to "pull snapshot" (i.e., take backup) of machine m001. Job 00002 is a job to replicate the backup for machine m003 to the secondary DMS cluster. Job 00003 runs analytics on the backup for machine m002. Job 00004 is an internal trash collection job. When a node of the DMS cluster 112 executes job 00001 to pull a snapshot of machine m001, it begins the method of FIG. 1 to possibly partition the fileset for machine m001 instead of taking a single snapshot of the entire fileset.

In this example, the fileset m001 is partitioned into multiple partitions, which are denoted as m001/p001, m001/p002, etc. This also generates jobs to fetch data for each of the partitions, as shown in the job queue 224 of FIG. 3C. Job 00011 is a job to fetch data for partition m001/p001, job 00012 is a job to fetch data for partition m001/p002, and so on. The partition table is also updated. FIG. 3D is an example of a partition table 225, illustrating the partitioning of machine m001. Each row of the partition table 225 is a different partition, identified by a partition ID "p_id." In this example, each partition ID specifies the machine and the partition. For example, "m001/p001" is partition p001 of machine m001. "parent_id" identifies the parent of the partition, which is m001 in this example. "p_definition" defines the partition. For example, partition m001/p001 contains files /a-/c of the fileset for machine m001.

FIG. 3E shows an example of a multi-layer partitioning. In this example, partition m001/p001 is further partitioned into random_name1, random_name2, etc. In the examples of FIGS. 3D-3E, each partition corresponds to a different alphabetical range of the namespace of the fileset of machine m001, but the partitions do not have to be defined in this way.

FIGS. 3F-3G are examples of a snapshot table 226 and image table 228, respectively, illustrating a series of backups for a partition p001 of a machine m001. Each row of the snapshot table is a different snapshot and each row of the image table is a different image. The snapshot is whatever is being backed up at that point in time. In the nomenclature of FIGS. 3F-3G, m001/p001.ss1 is a snapshot of partition p001 of machine m001 taken at time t1. In the suffix ".ss1", the .ss indicates this is a snapshot and the 1 indicates the time t1. m001/p001.ss2 is a snapshot of partition p001 of machine m001 taken at time t2, and so on. Images are what is saved in the data store 118 or archive system 120. For example, the snapshot m001/p001.ss2 taken at time t2 may not be saved as a full backup. Rather, it may be composed of a full backup of snapshot m001/p001.ss1 taken at time t1 plus the incremental difference between the snapshots at times t1 and t2. The full backup of snapshot m001/p001.ss1 is denoted as m001/p001.im1, where ".im" indicates this is an image and "1" indicates this is a full image of the snapshot at time t1. The incremental difference is m001/p001.im1-2 where "1-2" indicates this is an incremental image of the difference between snapshot m001/p001.ss1 and snapshot m001/p001.ss2.

In this example, the service schedule 222 indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001/p001.ss1. The ss_time is a timestamp of the snapshot, which is Oct. 1, 2017 at 3 am. im_list is the list of images used to compose the snapshot. Because this is the first snapshot taken, a full image of the snapshot is saved (m001/p001.im1). The image table 228 shows where this image is saved in the data store 118 or archive system 120. In order to have a complete snapshot of machine m001, snapshots of all partitions are pulled and saved. For convenience, only partition p001 is shown in the figures.

On Oct. 1, 2017 at 9 am (time t2), a second backup of machine m001 is made. This results in the second row of the snapshot table for snapshot m001/p001.ss2. The image list of this snapshot is m001/p001.im1 and m001/p001.im1-2. That is, the snapshot m001/p001.ss2 is composed of the base full image m001/p001.im1 combined with the incremental image m001/p001.im1-2. The new incremental image m001/p001.im1-2 is stored in data store 118 or archive system 120, with a corresponding entry in the image table 228. This process is performed for all partitions of the fileset and continues every 6 hours as additional snapshots are made. If partitions grow too large or small over time, they may be subdivided or combined as described below.

For virtual machines, pulling a snapshot for the VM typically includes the following steps: freezing the VM and taking a snapshot of the VM, transferring the snapshot (or the incremental differences) and releasing the VM. For example, the DMS cluster 112 may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIGS. 4A-B show the snapshot table 226 and image table 228 after backups have been taken for 3 days using the process described in FIG. 3. However, if the service schedule requires 6-hour backups only for the past 2 days, then the 6-hour backups for the first day October 1 are no longer needed. The snapshot m001/p001.ss1 is still needed because the service schedule requires daily backups, but snapshots .ss2, .ss3 and .ss4 can be deleted and are removed from the snapshot table 226. However, the incremental images .im1-2, .im2-3 and .im3-4 are still required to build the remaining snapshots.

FIGS. 4C-4D show the snapshot table 226 and the image table 228 after the base image is updated from .im1 to .im5. In updating the base image, a full image of snapshot 5 is created from the existing images. The new base image .im5 is shown as a new row in the image table 228. As shown in FIG. 4C, the im_list for snapshots .ss1 and .ss5 to .ss12 are also updated to stem from this new base image .im5. As a result, the incremental images .im1-2, .im2-3, .im3-4 and .im4-5 are no longer required and they can be deleted from the data store 118 and the image table 228. The full image .im1 also is no longer needed, although a new backwards incremental image .im5-1 is created so that snapshot .ss1 is still maintained. All of these deletions are indicated as crosshatched rows.

The description above is just one example. The various data structures may be defined in other ways and may contain additional or different information.

Snapshot Passthrough to Archive System

FIGS. 5A-D are block diagrams that illustrate a DMS cluster that operates as a passthrough for partitioned snapshot data to an archive system. The DMS cluster may be connected to different archive systems 120, and provides for selection of a particular archive system 120 to store snapshots. Some examples of an archive system 120 may include a cloud computing system, a network file system (NFS) store, or an object store. In another example, another DMS cluster 112 may be used as an archive system 120.

In addition to operating as a passthrough and temporary storage, the DMS cluster 112 stores fileset metadata to provide an index for the fileset on behalf of the archive system 120. As such, the archive system 120 may rely on the DMS cluster 112 to provide DMS services such as creation and restoration of snapshots, while the archive system 120 provides (e.g., scalable) storage space for the snapshots. The file set metadata stored at the DMS cluster 112 may be referenced to retrieve a partition or a file stored in a partition from the archive system 120, such as for recovery purposes.

Dividing a fileset into partitions and then pulling snapshots of each partition as a separate job takes advantage of the capability of each node 114 in the DMS cluster 112 to operate autonomously and in parallel with the other nodes 114. Partitioning the fileset enables the DMS cluster 112 to handle each partition separately, that is, as separate jobs performed autonomously by the nodes 114 in parallel. Performing these jobs in parallel avoids the traditional I/O speed bottleneck caused if only a single node 114 were required to pull a snapshot of the entire fileset. Instead, partitioning distributes the I/O load across the DMS cluster 112 and reduces the overall time required to pull the snapshot of the entire fileset. In some embodiments, the jobs are dynamically assigned to or distributed across the peer nodes 114 in a manner that increases parallelism and/or reduces an overall time required to pull the snapshot of the fileset.

Additionally, having a separate job for each partition increases fault tolerance of the DMS cluster 112. If the DMS cluster 112 encounters an issue when pulling a snapshot of a particular partition, only the job corresponding to that particular partition needs to be re-executed. In some embodiments, the job is re-executed by a node 114 of the DMS cluster 112 different from that which initially executed it.

Figure 5A:
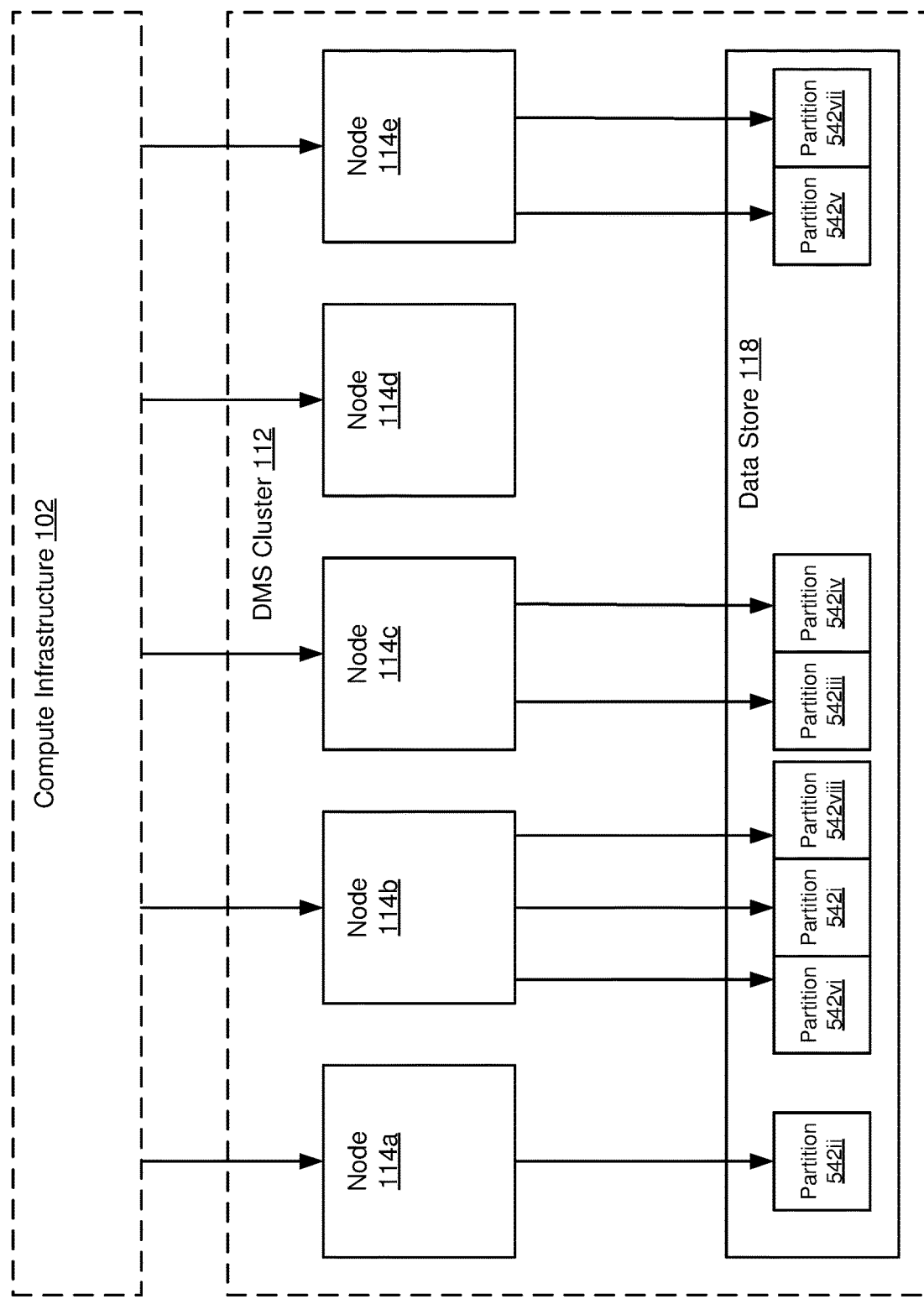
Figure 6:
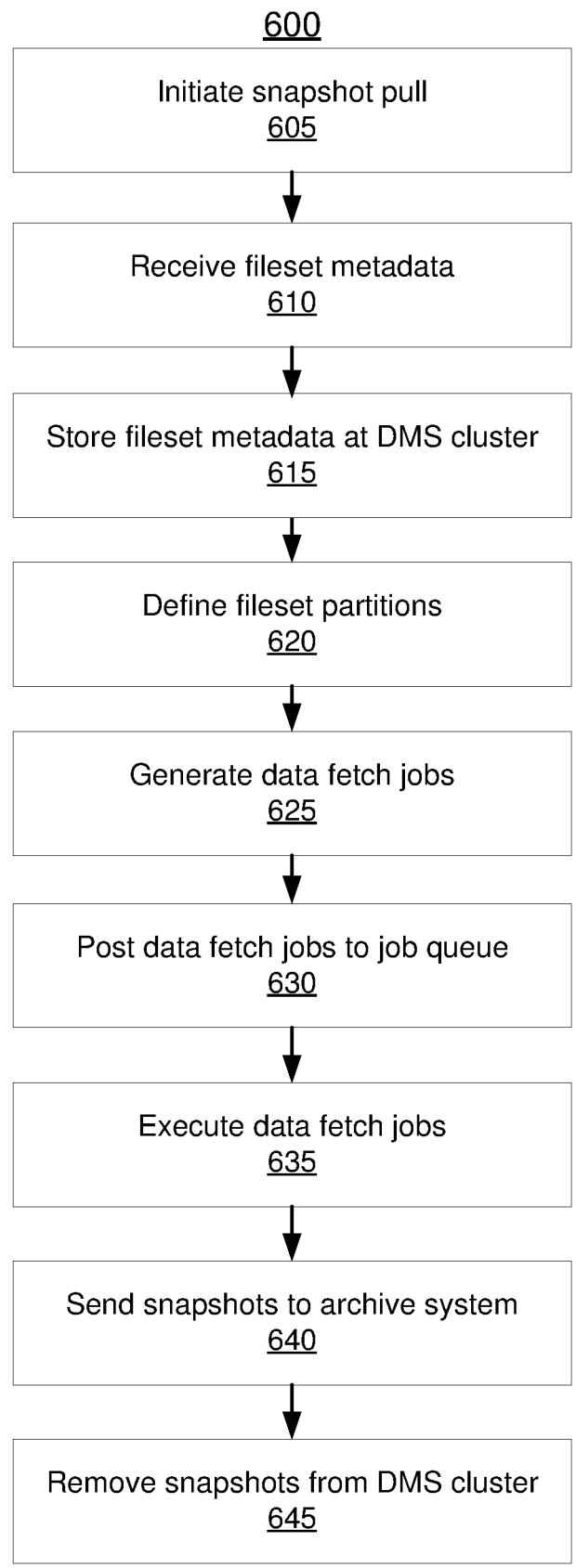
FIG. 6 is a flow chart of a process for generating a snapshot of a partition, according to one embodiment.

In FIG. 5A, the DMS cluster 112 pulls a full snapshot of a fileset in the compute infrastructure 102 according to a method 600 of FIG. 6. One of the nodes 114a of the DMS cluster 112 executes a "pull snapshot" job from the job queue 224, initiating 605 the snapshot pull.

Node 114a receives 610 fileset metadata from the computer infrastructure 102. The compute infrastructure 102 may include a network-attached storage (NAS) including the fileset. The DMS cluster 112 scans and ingests the fileset from the NAS. The fileset metadata describes the fileset of which is the snapshot is being taken and may include files, file paths and hierarchies, file sizes, and file types (i.e., content types). Node 114a of the DMS cluster 112 stores 615 the fileset metadata in the DMS cluster 112, such as in the DMS database 116.

Based on the fileset metadata, node 114a defines 620 the partitions for the fileset. Preferably, the partitions are determined with file-level granularity, that is, each file is fully contained within a single partition. Accordingly, if each partition is of equal size, the partition size must be as least equal to the size of the largest file in the fileset. Based on the partition size, node 114a assigns each file in the fileset to a partition.

In some embodiments, the number of partitions for the fileset is selected based on a local storage size of the peer DMS nodes 114. For example, the size of each partition should not exceed the local storage size of the peer DMS nodes 114. In another example, peer DMS nodes 114 may be dynamically assigned to a particular job. The number of partitions may be selected based on the number of DMS nodes 114 of the DMS cluster 112 allocated to the job. Additional DMS nodes 114 may be added or removed from the job to control the speed of the job or the amount of system resources dedicated to the job.

In one embodiment, each partition corresponds to a range within a namespace of the fileset, and files are assigned to partitions associated with the namespace range under which their file path falls. For example, the namespace range may be an alphabetical range (e.g., partition p001 contains "La" to "ld," partition p002 contains "/e" to "/h," etc.). This approach maintains the performance benefits of data locality.

In another embodiment, the fileset is partitioned based on file content. In a first embodiment, files with the same content type are grouped together and the groups of files are assigned to partitions. For example, JPEG files may be grouped together and assigned to a single partition (or group of partitions such that the majority of the group of partitions only contain JPEG files). This allows the DMS cluster 112 to optimize data management based on the content type. For example, compressing a partition of stored data may be easier or more effective if all of the data in the partition is of the same type. Additionally, grouping files in this manner can inform the DMS cluster's 112 handling of different data types, such as indexing text file contents (e.g., for word searching) and post-processing of images (e.g., for facial recognition). In a second embodiment, the node 114a receives information about the contents of each file in addition to the fileset metadata and assigns files to partitions based on content similarity. For example, documents and images determined to be associated with the same topic may be assigned to the same partition. The fileset metadata stored at the DMS cluster 112 may be updated to include the associations between each partition and the files of the fileset that belong to the partition.

After the partitions have been defined 620, the node 114a generates 625 data fetch jobs for each of the partitions. The data fetch jobs may be defined by an SLA indicating backups that are more than 0 days old may be moved to the archive system 120, which causes the DMS cluster 112 to operate as a passthrough to the archive system 120 for snapshot storage. These jobs are posted 630 to the job queue 224, where all of the nodes 114a-e can autonomously retrieve and execute 635 the jobs in parallel. Snapshots generated in the data fetch jobs may be provided 640 to an archive system 120 for storage, and removed 645 from the DMS cluster 112.

In the example of FIG. 5A, the fileset is stored in eight partitions 542i-viii of the data store 118 by the nodes 114 of the DMS cluster 112. Here, node 114a pulls a snapshot of partition 542ii; node 114b pulls snapshots of partitions 542i, vi, viii; node 114c pulls snapshots of partitions 542iii, iv; node 114d does not pull snapshots of any of the partitions; and node 114e pulls snapshots of partitions 542v, vii. The partitions 542 may be partitions of a full snapshot of the fileset. As shown, not all of the nodes 114 are required to perform the data fetch jobs for the partitions 542, and some nodes 114 may perform multiple data fetch jobs (concurrently, in some cases), while others may perform only a single data fetch job. Furthermore, the data fetch jobs do not need to be performed in numerical order. Because the data store 118 is distributed across the nodes of the DMS cluster 112, each partition 542 may be temporarily stored locally at the node 114 that pulled the snapshot for that partition 542 prior to transfer to the archive system 120.

Each of the nodes 114 provides a different pipeline for processing a partition. By breaking up the files of the fileset into different partitions, each partition can be processed in an independent pipeline. Each pipeline includes temporary space at least proportional to the size of the files of the partition that is processed by the pipeline. The DMS cluster 112 controls the concurrency level for processing by the pipelines, thus controlling the amount of resources that are dedicated to the job. For a job where storage space is not a concern, processing bandwidth of the DMS cluster 112 may be improved by running many pipelines concurrently. For a job where the DMS cluster 112 provides passthrough of the snapshots to the archive system 120, the DMS cluster 112 can limit the temporary space required in the data store 118 distributed across the nodes 114 by limiting the number pipelines that execute in parallel.

In FIG. 5B, the DMS cluster 112 provides the partitions 542 to the archive system 120, where the partitions 542 are stored. The partitions 542 may be removed from the data store 118 of the DMS cluster 112 after the transfer to the archive system 120. For example, the partition 542 that is stored locally at each node 114 may be deleted after the node 114 transfers the partition 542 to the archive system 120. Deleting the partitions 542 stored locally at each node 114 releases storage space of the node 114 that may be used for another fetch job, thereby reducing the storage requirements of the node 114 in providing DMS services. In some embodiments, different partitions are stored in different archive systems 120 and tracked by the DMS cluster 112.

Figure 5C:
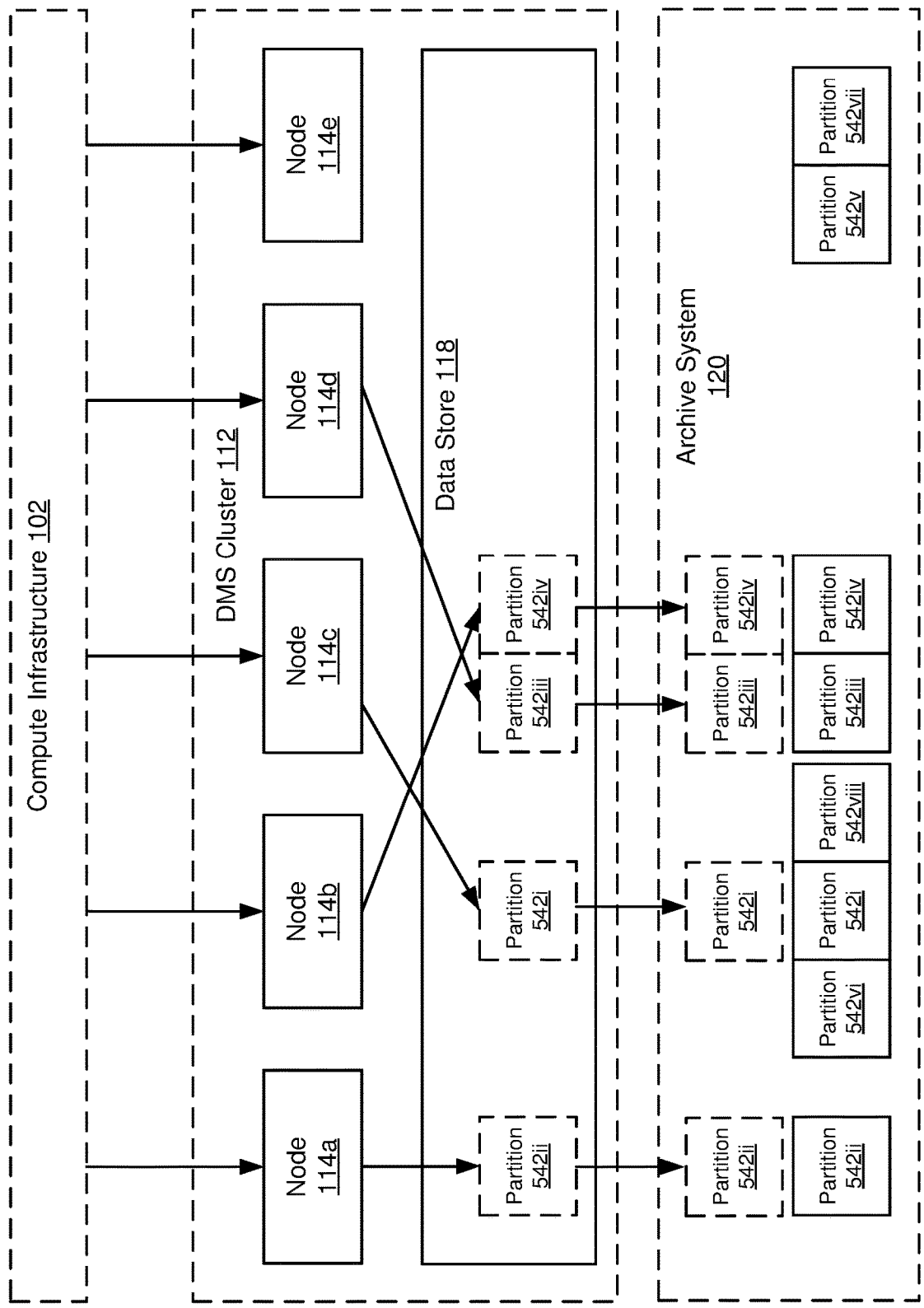

In FIG. 5C, at a later time, the DMS cluster 112 pulls another snapshot of the fileset. Because prior images of partitions 542$i$-$viii$ are already stored in the archive system 120, this snapshot need only store incremental images of those snapshots that have changed. In some embodiments, to generate an incremental snapshot, the node 114$a$ uses a Merged Journal File (MJF) that tracks writes to the files of the partition. The MJF may include a log of changes of the partition. The compute infrastructure 102 may include a network-attached storage (NAS) including the fileset. The DMS cluster 112 scans and ingests the fileset from the NAS to generate the MJF. The node 114$a$ generates a snapshot based on the MJF, and the MJF is deleted from the DMS cluster 112. The snapshot, if incremental, represents the changes of the partition from the partition at a prior time, such as at the time of a previous pull snapshot job for the partition. The node 114$a$ may also generate fileset metadata for the incremental snapshot (or "incremental fileset metadata," as used herein) that associates the incremental snapshot with a full snapshot of the partition. The incremental fileset metadata may indicate the incremental snapshot being stored in a particular archive system 120, and a location of the archive system 120.

In some embodiments, the MJF is a transaction log, with each write to disk being a transaction. The transaction log is ordered from first to last and may contain overlaps. The MJF is created or initialed as an empty transaction log that is filled up as data is ingested. A patch file is a representation of a delta change, and contains a list of non-overlapping segments. A segment is a representation of data (e.g., including offset, length, and data bytes) at a certain block location. A patch file is created by applying (or "playing back") changes of the MJF. Incremental snapshot changes are represented by patch files. In particular, an incremental snapshot is a patch file applied on top of a base snapshot (which may form a series of patch files). Full snapshots may be like incremental snapshots with an empty base snapshot, which means that the data itself is fully represented in the patch file.

In some embodiments, the incremental metadata may include a filesystem metadata file and a partitions file that accompany each snapshot. The filesystem metadata, or FMD file, contains information describing the entire file hierarchy of the fileset snapshot in lexicographical order. The partitions file is a list of delimiting paths in this FMD file, one for each partition. When a new snapshot is pulled, a new FMD file may be generated from the metadata scan. By comparing the new FMD file against the old FMD file, the file changes and corresponding partitions may be determined.

Assume that only partitions 542$i$-$iv$ are changed. In this example, node 114$c$ executes the data fetch job for partition 542$i$ and stores the incremental image. The base image for partition 542$i$ is stored in the archive system 120, so the incremental image is also transferred from the data store 118 to the archive system 120. Full images of partitions 542 are shown in solid line, while incremental images for partitions 542 are shown in dashed line. The node 114$c$ that handles the data fetch job for the incremental image may be different from the node 114$b$ that handled the data fetch job for the base image for the partition 542$i$. In one approach, data fetch jobs are assigned to nodes that handle prior images. In that approach, the data fetch job for partition 542$i$ would be assigned and executed by node 114$b$ instead of node 114$c$.

Similarly, the node 114$a$ generates an incremental image of partition 542$ii$, and provides the incremental image of the partition 542$ii$ to the archive system 120 where the incremental image is stored with previously captured full image of the partition 542$ii$. The node 114$b$ generates an incremental image of the partition 542$iv$, and the node 114$d$ generates an incremental image of the partition 542$i$. The incremental images of the partitions 542$i$, 542$ii$, 542$ii$, and 542$iv$ are transmitted to the archive system 120, and removed from the data store 118 of the DMS cluster 112. The fileset metadata for the fileset may be updated if there are changes to the files or the partitioning of the files.

In some embodiments, the DMS cluster 112 can repartition the fileset. This may be useful if portions of the fileset assigned to one partition have increased or decreased in size relative to the other portions of the fileset assigned to other partitions or fallen outside of predetermined minimum or maximum partition sizes. To do this, the DMS cluster 112 may combine and load several contiguous partitions 542 and then determine and store new partitions 542 in the data store 118. Corresponding changes are made to the snapshot table.

When pulling full or incremental snapshots, nodes 114 may fail during execution of the data fetch jobs. In response to this, the data fetch job for the partition may be re-posted to the job queue 224. The re-posted job may specify that it may not be performed by the failed node 114. Additionally, the failed node 114 may be decommissioned and prevented from executing further data fetch jobs for the snapshot after failing a threshold number of times.

Restoring Files or Partitions from Archive System

Figure 5D:
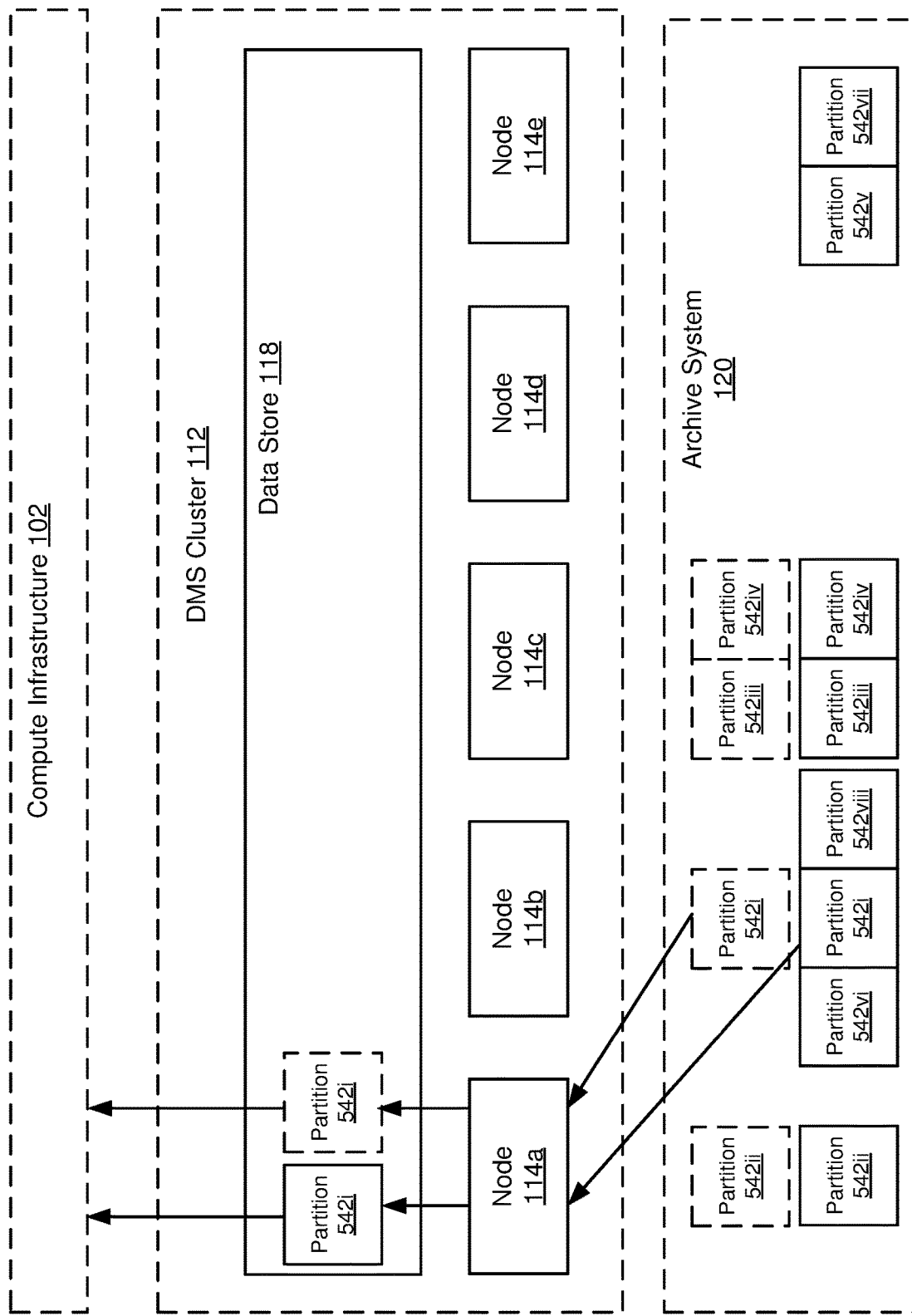
Figure 7:
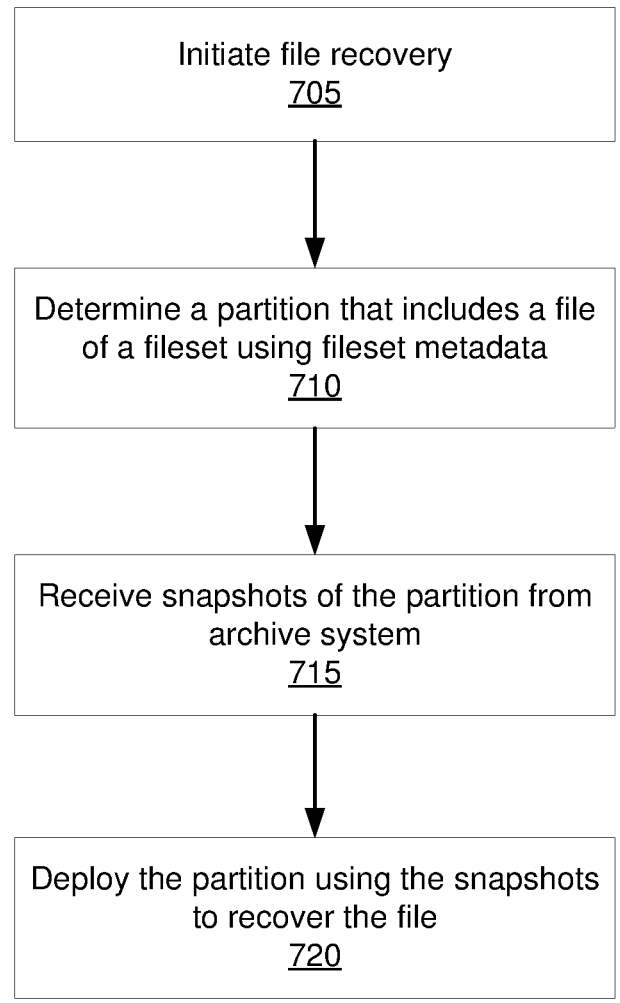
FIG. 7 is a flow chart of a process for restoring a snapshot of a partition, according to one embodiment.

The DMS cluster 112 facilitates the restoring of files or partitions of the fileset stored in the archive system 120. The restoring may include deploying snapshots retrieved from the archive system 120 to the compute infrastructure 102, or to the DMS cluster 112. In FIG. 5D, the DMS cluster 112 restores a partition for the compute infrastructure 102 according to a method 700 of FIG. 7. For example, one of the nodes 114 of the DMS cluster 112 may execute a "fetch data" job from the job queue 224, initiating 705 the file recovery for one or more files of the fileset. The files may belong to a single partition, or may be located in multiple partitions.

In some embodiments, the fetch data job is placed in the job queue 224 in response to a request from the compute infrastructure 102 or some other device connected to the DMS cluster 112. The request may include an indication of a file, a group of files, or a partition that is to be recovered from the archive system 120. A node 114, such as the node 114$a$, retrieves the job from the job queue 224.

The node 114$a$ determines 710 a partition that includes the file using fileset metadata. The fileset metadata may be generated and stored in the DMS cluster 112 as discussed above in steps 610 and 615 of the method 500. The node 114$a$ references the stored fileset metadata to determine the partition that includes the file to be recovered from the archive system 120. The fileset metadata may further include the snapshots of the partition, and the storage location (e.g., archive system 120) of the snapshots. All snapshots of a partition may be stored in the same data storage, or may be stored across different data storages. As shown in FIG. 5D, the partition 542*i* is selected for recovery.

The node 114*a* receives 715 one or more snapshots of the partition from the archive system 120. The snapshots may include a full image of the partition, as well as one or more incremental images of the partition if the incremental images have been captured. As shown in FIG. 5D, the node 114*a* retrieves the full image and incremental image of the partition 542*i* from the archive system 120, and stores the images of the partition 542*i* in the data store 118.

The node 114*a* or compute infrastructure 102 deploys 720 the partition using the snapshots to recover the file. For example and as shown in FIG. 5D, the node 114*a* may provide the snapshots of the partition 542*i* to the compute infrastructure 102, and the compute infrastructure 102 may deploy the partition 542*i* using the snapshots to recover the file. In another example, the node 114*a* may deploy the partition 542*i* in the DMS cluster 112 to recover the partition. The DMS cluster 112 may send files in partition to compute infrastructure 102.

Pulling snapshots at the partition-level instead of the full fileset- or machine-level has advantages when accessing the stored data, such as in order to restore aspects of the computer infrastructure 102. First, similarly to how the DMS cluster 112 can pull snapshots of partitions in parallel, the DMS cluster 112 can also load and/or restore snapshots of partitions in parallel. This distribution of the overall I/O load results in increased overall speed. Furthermore, instead of receiving and loading the entire snapshot of a fileset, the DMS cluster 114 may receive from the archive system 120 and load only those partitions 542 that are needed. For example, the DMS cluster 112 can restore only certain files in the fileset instead of the full fileset.

Figure 8:
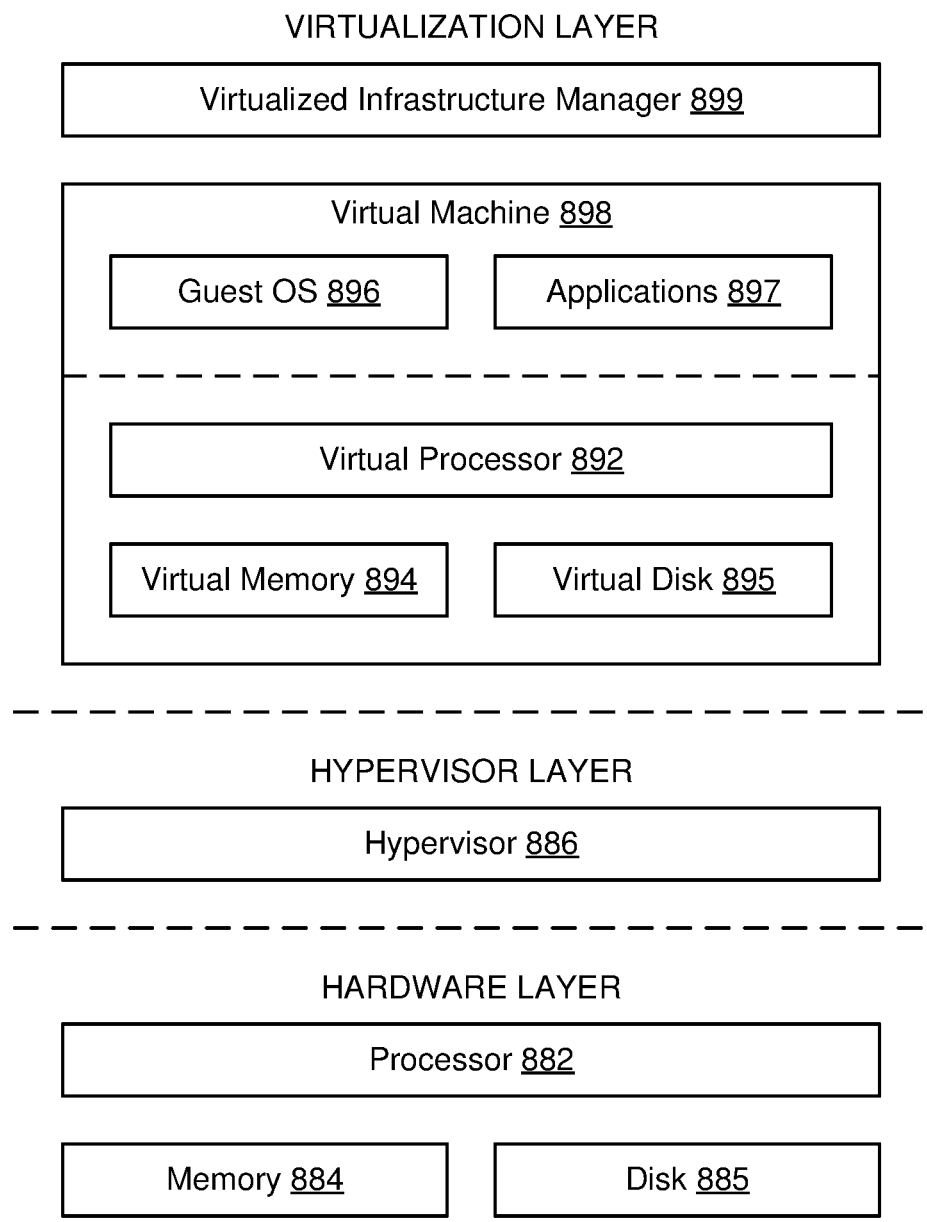
FIG. 8 is a block diagram of a virtual machine, according to one embodiment.
Figure 9:
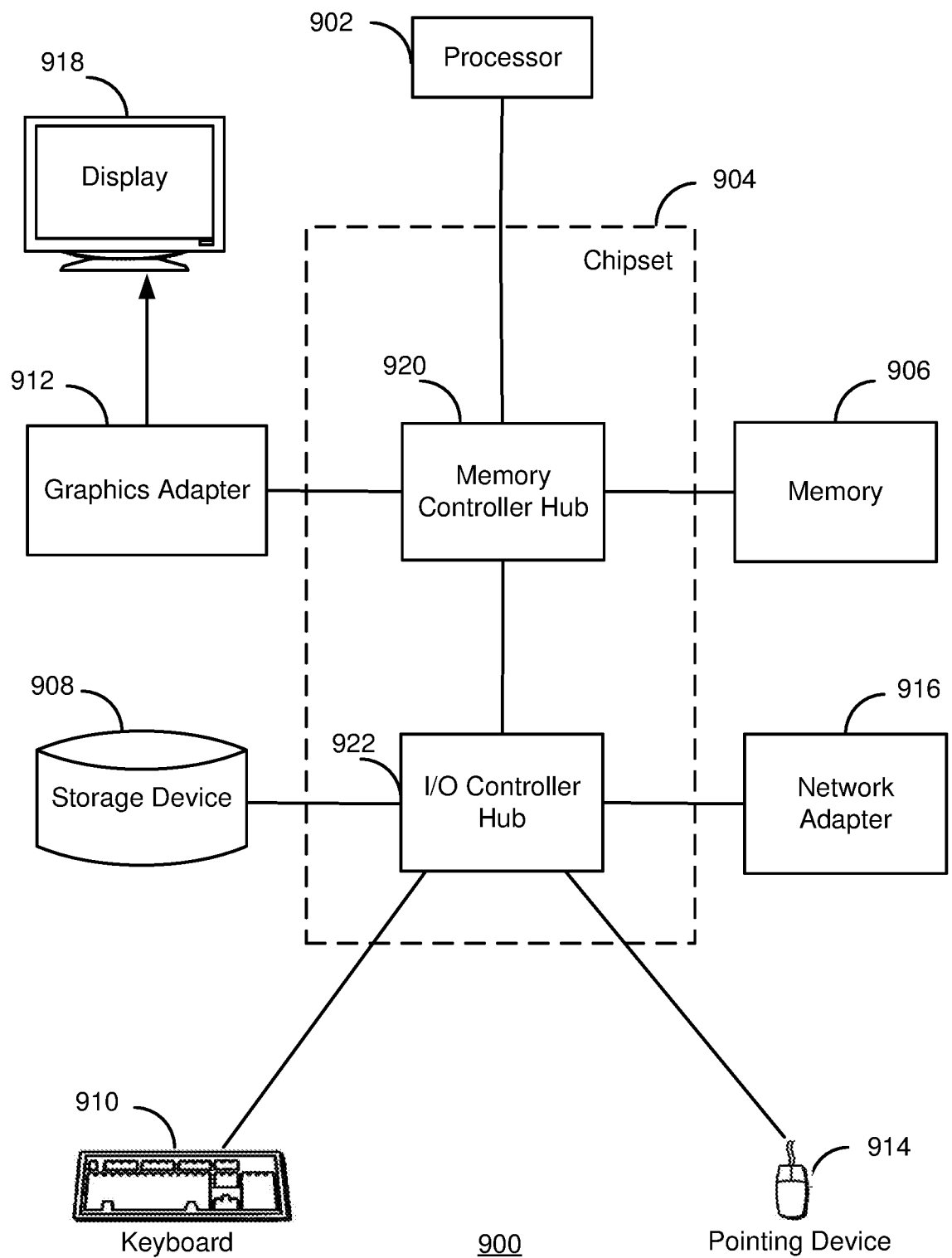
FIG. 9 is a block diagram of a computer system suitable for use in a DMS system, according to one embodiment.

FIG. 8 is a block diagram of a server for a VM platform, according to one embodiment. The server includes hardware-level components and software-level components. The hardware-level components include one or more processors 882, one or more memory 884, and one or more storage devices 885. The software-level components include a hypervisor 886, a virtualized infrastructure manager 899, and one or more virtual machines 898. The hypervisor 886 may be a native hypervisor or a hosted hypervisor. The hypervisor 886 may provide a virtual operating platform for running one or more virtual machines 898. Virtual machine 898 includes a virtual processor 892, a virtual memory 894, and a virtual disk 895. The virtual disk 895 may comprise a file stored within the physical disks 885. In one example, a virtual machine may include multiple virtual disks, with each virtual disk associated with a different file stored on the physical disks 885. Virtual machine 898 may include a guest operating system 896 that runs one or more applications, such as application 897. Different virtual machines may run different operating systems. The virtual machine 898 may load and execute an operating system 896 and applications 897 from the virtual memory 894. The operating system 896 and applications 897 used by the virtual machine 898 may be stored using the virtual disk 895. The virtual machine 898 may be stored as a set of files including (a) a virtual disk file for storing the contents of a virtual disk and (b) a virtual machine configuration file for storing configuration settings for the virtual machine. The configuration settings may include the number of virtual processors 892 (e.g., four virtual CPUs), the size of a virtual memory 894, and the size of a virtual disk 895 (e.g., a 10 GB virtual disk) for the virtual machine 898.

The virtualized infrastructure manager 899 may run on a virtual machine or natively on the server. The virtualized infrastructure manager 899 corresponds to the virtualization module 106 above and may provide a centralized platform for managing a virtualized infrastructure that includes a plurality of virtual machines. The virtualized infrastructure manager 899 may manage the provisioning of virtual machines running within the virtualized infrastructure and provide an interface to computing devices interacting with the virtualized infrastructure. The virtualized infrastructure manager 899 may perform various virtualized infrastructure related tasks, such as cloning virtual machines, creating new virtual machines, monitoring the state of virtual machines, and facilitating backups of virtual machines.

FIG. 8 is a high-level block diagram illustrating an example of a computer system 800 for use as one or more of the components shown above, according to one embodiment. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the computer system 800 have different architectures. For example, the memory 806 is directly coupled to the processor 802 in some embodiments.

The storage device 808 includes one or more non-transitory computer-readable storage media such as a hard drive, compact disk read-only memory (CD-ROM), DVD, or a solid-state memory device. The memory 806 holds instructions and data used by the processor 802. The pointing device 814 is used in combination with the keyboard 810 to input data into the computer system 800. The graphics adapter 812 displays images and other information on the display device 818. In some embodiments, the display device 818 includes a touch screen capability for receiving user input and selections. The network adapter 816 couples the computer system 800 to a network. Some embodiments of the computer 800 have different and/or other components than those shown in FIG. 8. For example, the virtual machine 104, the physical machine 108, and/or the DMS node 114 can be formed of multiple blade servers and lack a display device, keyboard, and other components.

The computer 800 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 808, loaded into the memory 806, and executed by the processor 802.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. In a data management and storage (DMS) cluster comprising a plurality of peer DMS nodes and a distributed data store implemented across the plurality of peer DMS nodes, a method comprising:

receiving, by a first peer DMS node of the plurality of peer DMS nodes, fileset metadata for a fileset of a compute infrastructure serviced by the DMS cluster;

determining, by the first peer DMS node, a plurality of fileset partitions for the fileset based on the fileset metadata;

executing, by the plurality of peer DMS nodes, separate jobs to generate respective snapshots of respective fileset partitions of the plurality of fileset partitions based at least in part on the first peer DMS node determining the plurality of fileset partitions, wherein a peer DMS node of the plurality of peer DMS nodes executes one of the separate jobs to generate one of the respective snapshots autonomously and concurrently with other ones of the separate jobs that are executed by other peer DMS nodes of the plurality of peer DMS nodes to generate other ones of the respective snapshots, and wherein generating the one of the respective snapshots of a respective fileset partition is based at least in part on storing the respective fileset partition using a local storage within the peer DMS node;

transferring, by the plurality of peer DMS nodes, the respective snapshots of the respective fileset partitions to a data storage separate from the distributed data store of the DMS cluster for storage at the data storage; and removing, by the peer DMS node, the respective fileset partition from the local storage of the peer DMS node subsequent to transferring the respective snapshots to the data storage.

2. The method of claim 1, wherein the distributed data store is implemented across local storages of the plurality of peer DMS nodes, the local storages comprising at least the local storage of the peer DMS node.

3. The method of claim 2, wherein defining the plurality of fileset partitions comprises determining a number of fileset partitions based on a size of the fileset and based on a size of the local storages of the plurality of peer DMS nodes.

4. The method of claim 1, wherein the data storage is one of:
a cloud storage connected to the DMS cluster via a network;
a network file system store; or
an object store.

5. The method of claim 1, further comprising storing the fileset metadata in the distributed data store, the fileset metadata associating a file of the fileset with a fileset partition of the plurality of fileset partitions.

6. The method of claim 5, further comprising at least one of the plurality of peer DMS nodes recovering a file from the data storage using the fileset metadata stored in the distributed data store.

7. The method of claim 6, wherein recovering the file from the data storage using the fileset metadata includes:
determining a fileset partition that includes the file using the fileset metadata;
retrieving one or more snapshots of the fileset partition from the data storage; and
deploying the fileset partition using the one or more snapshots.

8. The method of claim 7, wherein retrieving one or more snapshots of the fileset partition includes storing the one or more snapshots in the distributed data store.

9. The method of claim 7, wherein the fileset partition is deployed in at least one of the compute infrastructure or the DMS cluster.

10. The method of claim 6, wherein recovering the file from the data storage using the fileset metadata includes retrieving from the data storage only the fileset partition required to restore the file.

11. The method of claim 5, further comprising the peer DMS node of the plurality of peer DMS nodes recovering files from the data storage using the fileset metadata stored in the distributed data store based on:
determining multiple fileset partitions that include the files using the fileset metadata;
the peer DMS node retrieving one or more snapshots of a fileset partition of the multiple fileset partitions from the data storage; and
the peer DMS node deploying the fileset partition retrieved by the peer DMS node using the one or more snapshots of the fileset partition.

12. The method of claim 1, wherein determining the plurality of fileset partitions for the fileset based on the fileset metadata includes determining a number of fileset partitions based on at least one of:
a local storage size of the plurality of peer DMS nodes; or
a number of the plurality of peer DMS nodes of the DMS cluster allocated to generating the respective snapshots.

13. The method of claim 1, wherein transferring, by the plurality of peer DMS nodes, the respective snapshots of the respective fileset partitions to the data storage includes:
selecting, by the plurality of peer DMS nodes, the data storage from a plurality of data storages based on instructions from a user associated with the compute infrastructure.

14. The method of claim 1, wherein the plurality of peer DMS nodes executing the separate jobs to generate the respective snapshots of the respective fileset partitions of the plurality of fileset partitions includes, for a respective fileset partition and by at least one peer DMS node of the plurality of peer DMS nodes:
writing transactions associated with the respective fileset partition to a merged journal file; and
generating an incremental snapshot of the respective fileset partition based on the merged journal file.

15. The method of claim 14, wherein the merged journal file is stored in the distributed data store, the method further comprising:
removing the merged journal file from the distributed data store subsequent to generating the incremental snapshot of the respective fileset partition.

16. The method of claim 14, further comprising:
the at least one peer DMS node generating incremental fileset metadata for the incremental snapshot, the incremental fileset metadata associating the incremental snapshot with a full snapshot of the respective fileset partition; and
the at least one peer DMS node storing the incremental fileset metadata in the distributed data store.

17. The method of claim 16, wherein the incremental fileset metadata indicates the incremental snapshot being stored in the data storage and a location of the data storage.

18. A data management and storage (DMS) cluster comprising one or more hardware processors, one or more memories, and one or more storage devices, the DMS cluster comprising:
a plurality of peer DMS nodes that service a compute infrastructure; and a distributed data store implemented across the plurality of peer DMS nodes; wherein a peer DMS node of the plurality of peer DMS nodes includes a software stack for: receiving fileset metadata for a fileset of the compute infrastructure; determining a plurality of fileset partitions for the fileset based on the fileset metadata; executing a separate job to generate a respective snapshot of a respective fileset partition of the plurality of fileset partitions based at least in part on determining the plurality of fileset partitions, wherein the peer DMS node of the plurality of peer DMS nodes executes the separate job to generate the respective snapshot autonomously and concurrently with other separate jobs that are executed by other peer DMS nodes of the plurality of peer DMS nodes to generate other respective snapshots of other respective fileset partitions of the plurality of fileset partitions, and wherein generating the respective snapshot of the respective fileset partition is based at least in part on storing the respective fileset partition using a local storage within the peer DMS node; transferring the respective snapshot of the respective fileset partition to a data storage separate from the distributed data store of the DMS cluster for storage at the data storage; and removing the respective fileset partition from the local storage of the peer DMS node subsequent to transferring the respective snapshots to the data storage.

19. A non-transitory computer-readable medium comprising instructions that when executed by a processor cause the processor to execute a method, the method comprising:

receiving, by a first peer data management and storage (DMS) node of a plurality of peer DMS nodes of a DMS cluster, fileset metadata for a fileset of a compute infrastructure serviced by the DMS cluster;

determining, by the first peer DMS node, a plurality of fileset partitions for the fileset based on the fileset metadata;

executing, by the plurality of peer DMS nodes, separate jobs to generate respective snapshots of respective fileset partitions of the plurality of fileset partitions based at least in part on the first peer DMS node determining the plurality of fileset partitions, wherein a peer DMS node of the plurality of peer DMS nodes executes one of the separate jobs to generate one of the respective snapshots autonomously and concurrently with other ones of the separate jobs that are executed by other peer DMS nodes of the plurality of peer DMS nodes to generate other ones of the respective snapshots, and wherein generating the one of the respective snapshots of a respective fileset partition is based at least in part on storing the respective fileset partition using a local storage within the peer DMS node;

transferring, by the plurality of peer DMS nodes, the respective snapshots of the respective fileset partitions to a data storage separate from a distributed data store implemented across the plurality of peer DMS nodes of the DMS cluster for storage at the data storage; and removing, by the peer DMS node, the respective fileset partition from the local storage of the peer DMS node subsequent to transferring the respective snapshots to the data storage.

* * * * *